United States Patent [19]

Courtois

[11] Patent Number: 5,156,442
[45] Date of Patent: Oct. 20, 1992

[54] DEVICE FOR ATTACHING SEAT BACKS TO CORRESPONDING SITTING PORTIONS

[75] Inventor: Bernard Courtois, Morigny-Champigny, France

[73] Assignee: Bertrand Faure Automobile, France

[21] Appl. No.: 627,206

[22] Filed: Dec. 13, 1990

[30] Foreign Application Priority Data

Dec. 18, 1989 [FR] France ............... 89 16713

[51] Int. Cl.$^5$ ............................................. A47C 7/00
[52] U.S. Cl. .................................. 297/443; 297/444
[58] Field of Search ............................. 297/443, 444

[56] References Cited

U.S. PATENT DOCUMENTS

| | | | |
|---|---|---|---|
| 2,456,794 | 12/1948 | Richardson | 297/443 |
| 4,746,168 | 5/1988 | Bracesco | 297/443 |
| 4,890,888 | 1/1990 | Kostin | 297/443 |
| 4,919,486 | 4/1990 | Chinomi et al. | 297/443 |
| 4,971,380 | 11/1990 | Cote et al. | 297/444 |

Primary Examiner—P. W. Echols
Assistant Examiner—David P. Bryant
Attorney, Agent, or Firm—Larson and Taylor

[57] ABSTRACT

The invention relates to improvements to devices for attaching seat backs on corresponding sitting portions. To assemble a vehicle seat back on a corresponding sitting portion, the seat back comprises two trapezoidal flat cases (1), each containing a bent wire spring (8) whose ends ($8_1$) are urged towards each other, these ends passing through two horizontal slots formed in the cases. The sitting portion comprises two trapezoidal wedges (2) complementary to the cases. The oblique edges of the wedges are formed with inclined slots (12, 13) through which the ends of the spring also pass.

9 Claims, 1 Drawing Sheet

U.S. Patent
Oct. 20, 1992
5,156,442
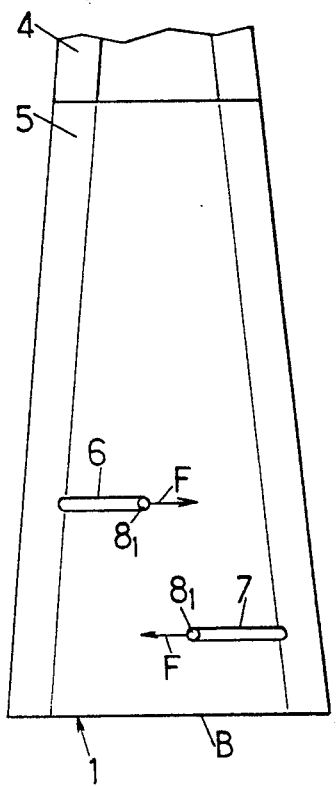
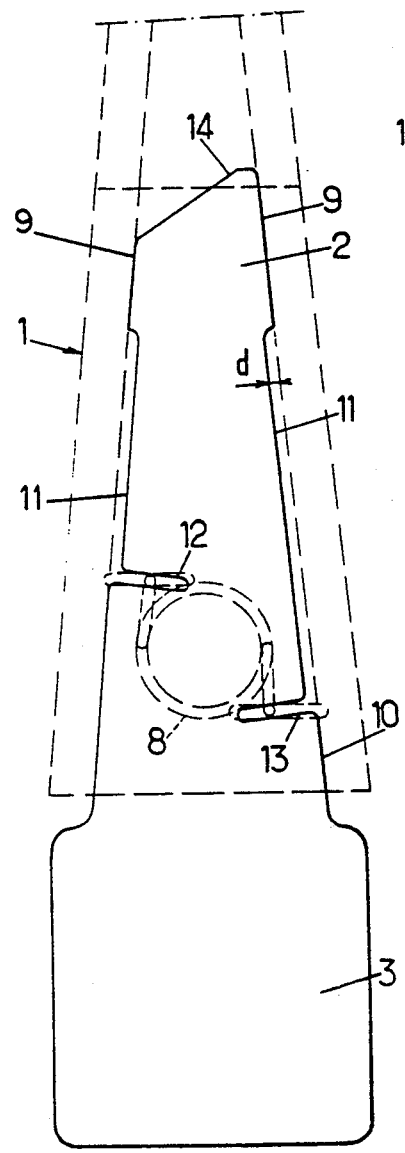
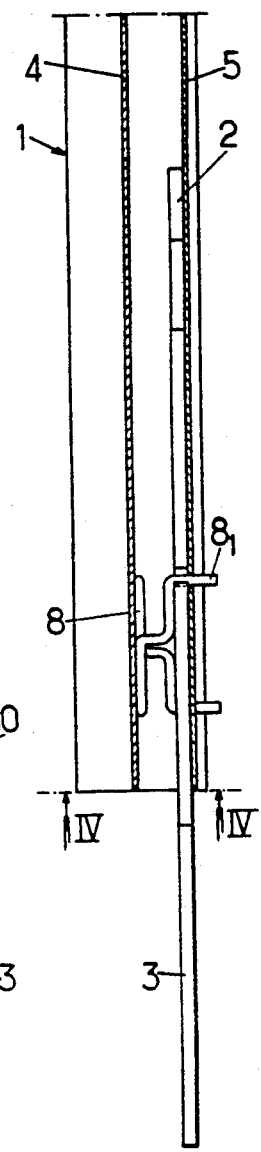
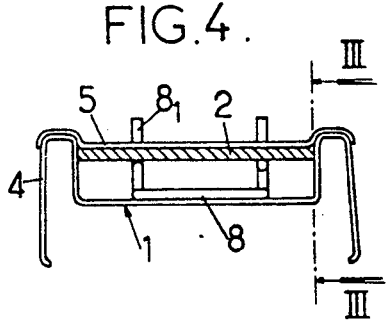
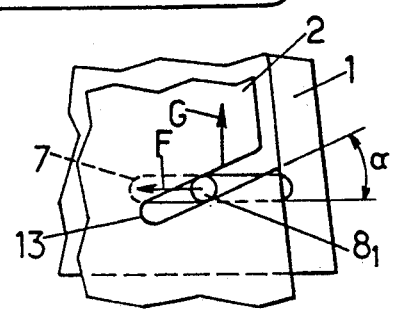

DEVICE FOR ATTACHING SEAT BACKS TO CORRESPONDING SITTING PORTIONS

The invention relates to devices for attaching vehicle seat backs on the corresponding sitting portions and more particularly those of such devices comprising on each side of the seat, on the one hand, a vertical flange connected to the framework of the sitting portion of the seat, particularly via articulations for adjusting the inclination of the seat back and, on the other hand, a foot forming part of the framework of the seat back.

In embodiments known at the present time of such devices, the feet are connected to the flanges by nut-bolt systems, which is time-wasting, relatively costly, difficult to automate and requires special precautions for preventing unintentional loosening.

The object of the invention is especially to overcome such drawbacks by adapting the attachment devices of the kind in question so that they make it possible to obtain solid attachments at low prices and in a particularly simple and rapid way lending itself to robotization.

For this purpose, in the attachment device according to the invention, each of the feet comprises a flat trapezoidal case open at its large base and containing a bent wire spring, one end at least of which, oriented perpendicularly to the parallel trapezoidal faces of the case, passes through a slot with parallel edges formed in one of these faces. Each of the two flanges forms a trapezoidal plate which can be housed jointingly in the case, the spring end passing through a slot with parallel edges formed in an oblique edge of said plate. The two slots extend substantially in the common direction of the large bases of the trapeziums, but are inclined with respect to each other so that the resilient force of the spring end which passes through them results in pushing the plate back against the bottom of the case in the direction perpendicular to the above large bases. Thus, the introduction of the spring end into the slots is naturally irreversible.

In preferred embodiments, recourse is further had to one and/or the other of the following arrangements:

The two ends of the spring contained in each case are oriented perpendicularly to the parallel trapezoidal faces of this case and pass respectively through two slots with parallel edges formed in one of these faces at different distances from the large base of the corresponding trapezium. These two slots are offset one from the other in the direction of said large base and the two ends concerned of the spring are urged resiliently mutually towards each other and further pass respectively through two slots with parallel edges formed respectively in the two oblique edges of the plate contained in said case, with the different slots extending substantially in the above direction. However, the two slots through which the same spring end passes are inclined with respect to each other so that urging of this end results in pushing the plate back against the sides of the case in the direction perpendicular to the above direction, and so that introduction of said spring end into said slots is naturally irreversible.

The relative angle of inclination of the mean lines of the two slots through which the same spring end passes is between 5 and 12 degrees.

The median zone of each oblique edge of the trapezoidal plate, formed by a slot is defined by a rectilinear ramp offset inwards of the plate with respect to said edge by a distance equal to the diameter of the wire forming the spring and said ramp is connected to said slot at its end the closest to the large base of the corresponding trapezium.

The plate is applied against one of the two trapezoidal faces of the case by the spring itself, which is interposed jointingly, in this case, between said plate and the other trapezoidal face of said case.

Each slot formed in one of the two trapezoidal walls of the case extends parallel to the large base of the corresponding trapezium and each slot formed in the plate is inclined slightly with respect to the large base while drawing closer thereto the nearer the centre of the plate.

The end of the trapezoidal plate disposed on the same side as the small base of the trapezium is formed as a point so that the beginning of introduction of this plate into the case fitted with the spring is facilitated and so that such introduction results in automatically setting this spring in the correct direction.

Apart from these main arrangements, the invention comprises certain other arrangements which are preferably used at the same time and which will be more explicitly discussed hereafter.

In what follows, some preferred embodiments of the invention will be described with reference to the accompanying drawings in a way which is of course in no way limitative.

FIG. 1 of these drawings shows in elevation one of the two elements forming an attachment device according to the invention;

FIG. 2 shows, also in elevation, the other element of this attachment device, the first one being shown with phantom lines;

FIGS. 3 and 4 show the complete attachment device, respectively in vertical section through III—III of FIG. 4 and in horizontal section through IV—IV of FIG. 3;

FIG. 5 is an explanatory figure.

The attachment device considered is intended for fixing a vehicle seat back on the sitting portion of a seat.

It is formed of two identical halves provided respectively on both sides of the seat.

Each of these two halves comprises:

a first element or flat case 1 having the general form of an isosceles trapezium with lower large base B open downwards, this case forming the lower end of one of the two feet of the framework of the seat back, and a second element in the form of a trapezoidal plate or "wedge" 2 widening downwards and extending upwards, a plate 3 which itself forms part of the framework of the sitting portion of the seat, or of an articulation, mounted on this framework and enabling the inclination of the seat back to be adjusted.

The case 1 is formed by the hollowed back of a metal part 4 widening downwards in the form of an isosceles trapezium and bent so that the back, considered transversely, as in FIG. 4, forms a central U, plus side this back being closed by a cover 5 having the same general form.

This cover 5 has formed therein two slots 6 and 7 with parallel rectilinear edges which extend parallel to the large base B of the trapezium, are situated at different levels and are offset horizontally with respect to each other, the length of each slot being a little less than half the width of the case at its level.

The case contains a spring 8 made from curved steel wire whose two ends $8_1$ are oriented perpendicularly to cover 5 and pass respectively through the two slots 6 and 7.

This spring 8 is applied against the hollowed back of part 4 (see FIG. 4).

It is loaded in a direction such that its ends $8_1$ tend to draw closer together, i.e. urged towards the inward ends of slots 6 and 7 the closest to the plane of symmetry of case 1, as shown by arrows F in FIG. 1.

As for the plate or "wedge" 2, it is the end portions 9, 10 of each of its two oblique edges which are intended to abut at the end of travel against complementary flat side surfaces of case 1 (see FIG. 2).

The central portions of these two oblique edges are defined by two rectilinear and oblique ramps 11 which are offset inwardly of the plate with respect to said edges, by a distance d equal to the diameter of the wire forming spring 8.

The lower ends of these ramps 11 are connected to two slots 12, 13 with parallel rectilinear edges formed in the plate.

The width of each of slots 12 and 13—like that of the above slots 6, 7—is very slightly greater than d so that these slots may receive and guide the ends of the spring without tightness.

The mutual vertical and horizontal offsets of the two slots 12, 13 or more precisely of their centres, are identical to those of the two slots 6 and 7 so that these different slots may cooperate in pairs and simultaneously with the ends $8_1$ of the spring which pass therethrough in turn.

Slots 12 and 13 are also slanted with respect to the horizontal, downwards from their mouth as can be seen in FIG. 2 or in FIG. 5. In FIG. 5 the corresponding angle of inclination $\alpha$ has been greatly exaggerated to make the drawing clear.

This angular difference $\alpha$ between the orientations of the two sets of slots (6, 12; 7, 13) cooperating with the same spring end $8_1$ transforms the above described horizontal resilient force F, exerted by said ends $8_1$, into a very strong vertical thrust G applied upwards on plate 2 and urging it in its turn upwardly against the sides of case 1.

Each end $8_1$ can in fact only progress towards the inward end of the horizontal slot concerned (6, 7) by causing the upper edge of the corresponding inclined slot (12, 13) of plate 2 to slide thereagainst, with the result of raising this plate.

The whole of the plate and case is dimensioned so that the application in question of plate 2 against the sides of case 1 is obtained when the ends $8_1$ have not yet reached the inward ends of the corresponding slots.

The angle $\alpha$ is chosen so that introduction of ends $8_1$ into slots 12, 13 is irreversible in that it is not possible to free said ends from said slots by simply exerting separation forces between the elements 1 and 2: this angle is preferably between 5° and 12°.

Spring 8 is dimensioned so that, at after fitting plate 2 at against the sides of case 1, this spring is interposed jointingly, in the transverse direction of the seat, between plate 2 and the trapezoidal wall of case 1 other than the cover 5 through which said spring passes, i.e. the hollowed back mentioned above of the metal piece 4.

Consequently, after such fitting, plate 2 is strongly applied, in said transverse direction, against cover 5.

Furthermore, because of the wedge shape of the cooperating surfaces of plate 2 and of case 1, a mutual solid assembly is thus obtained without play of these to parts.

The design of spring 8 is provided so that a sufficient space is reserved between its bent portion and cover 5 for receiving plate 2.

The upper end of this plate, which is the narrowest, is designed in the form of a point 14 for facilitating its introduction between the two ends $8_1$ of the spring.

The mutual assembly of the two parts 1 and 2 is then achieved very simply by vertically fitting the first one on the second.

Such fitting results in the succession of following operations:

introduction of point 14 between the two ends $8_1$, which are forced resiliently apart, and which remain constantly guided in slots 6 and 7, sliding along said ends $8_1$ first of all of the oblique end surfaces 9 of plate 2, then of the oblique ramps 11 of this plate, and finally, sudden introduction of the ends $8_1$ into slots 12 and 13 with powerful resilient application, permanently maintained, of plate 2 against the sides of case 1.

The attachment device thus formed is extremely solid since, to separate the two parts 1 and 2 thus joined together, it would be necessary to shear the ends $8_1$ of spring 8.

Now, the construction and diameter of this spring excludes such a possibility; in advantageous embodiments, spring 8 is formed by a steel wire having a diameter of 2 mm.

With parts 1 and 2, and thus the seat back and the sitting portion of the seat which are respectively equipped with these two parts, assembled together, they can no longer be separated unintentionally after the above assembly has been realized.

But this assembly is not absolutely irreversible.

It is in fact possible to separate parts 1 and 2 by moving ends $8_1$ sufficiently apart for them to be completely freed from slots 12 and 13, then by vertically freeing part 1 from part 2 by sliding said ends $8_1$ against the oblique ramps 11, then against the top portion 9 of the edges of wedge 2.

To obtain such mutual separation of ends $8_1$, it is advisable to use a special tool, for example in the form of a wedge, adapted to be introduced between the two ends $8_1$ to be mutually separated.

Such a tool may also be a rotary tool formed with two curved slots with progressive spacing.

Following which and whatever the embodiment adopted, devices are finally obtained for attaching vehicle seat backs to the corresponding sitting portions whose construction and implementation are sufficiently clear from the foregoing.

The devices have numerous advantages with respect to those known heretofore, in particular the following:

they make assemblies possible which are extremely easy, rapid and solid and lend themselves perfectly to automation, these assemblies are obtained by particularly economic means since the price of a spring of the type of the above spring 8 described is less than that of the multiple nutbolt systems of sufficient diameters generally adopted for safely providing the desired function.

As is evident, and as it follows moreover from the above, the invention is in no way limited to those of its modes of application and embodiments which have been more especially considered: it embraces, on the contrary, all variants thereof, particularly:

those where the inclinations of the slots formed respectively in the plate and in the case are different from those indicated above, provided of course that the inclinations of the two slots through which the same spring end passes differ from each other in the direction for which the resilient force of this end results in application of plate 2 against the bottom of case 1, the two slots 12 and 13 formed in the plate being for example possibly horizontal whereas slots 6 and 7 formed in the case are slanted with respect to the horizontal and rise towards the plane of symmetry of the case, those where the wire forming the spring has a section other than circular, for example square or flattened, so that the surfaces of this wire coming into contact with the facing edges of the slots which they pass through have larger surfaces than for a round wire, and those where only one end of the spring is adapted for cooperating with a pair of slots with parallel edges whose mean lines are inclined with respect to each other, in the above described way, the other end of said spring then being fixed in the case in any desirable way, the diameter of the spring being then increased accordingly.

I claim:

1. An attachment device for attaching a vehicle seat back to a corresponding sitting portion, comprising:

a vertical flange connected to the framework of the sitting portion of the seat and a foot forming part of the framework of the seat back, the foot comprising a flat trapezoidal case having parallel trapezoidal faces, open at its large base and containing a bent wire spring, the ends of which extend perpendicularly to the planes of the parallel trapezoidal faces of the case and pass through respective slots with parallel edges formed in one of the faces, the flange forming a trapezoidal plate which can be housed jointingly in said case, said spring ends passing through respective slots with parallel edges formed in oblique edges of said plate, each of said slots extending, generally parallel to the large bases of the case and plate trapeziums, with the plate slots and the face slots being inclined with respect to each other so that the resilient force of the spring ends which pass through the case and plate results in pulling the plate and the case towards each other in the direction perpendicular to said large bases, such that introduction of said spring end into said slots in the plate and case is naturally irreversible.

2. An attachment device according to claim 1, wherein the two slots in the case are located at different distances from the large base of the trapezoidal case, these two slots being offset one from the other and parallel to the base of the trapezoidal case, the two said ends of the spring being urged resiliently mutually towards each other, and each spring end passing through a slot formed in the plate with parallel edges, intersecting and extending inwardly from a different oblique edge of the plate, all four slots extending generally parallel to the large bases of the case and plate trapeziums, but the two slots through which each given spring end passes being inclined with respect to each other so that the force of each spring end in the direction parallel to the bases results in pulling the plate and the case towards each other in the direction perpendicular to said large bases, such that introduction of each spring end into its respective pair of slots in the case and plate is naturally irreversible.

3. An attachment device according to claim 1, wherein the relative angle of inclination of the two slots through which each spring end passes is between 5 and 12 degrees.

4. An attachment device according to claim 1, wherein each oblique edge of the trapezoidal plate from and above the slot in the plate which that edge intersects includes a rectilinear ramp offset inwards of the plate with respect to the remainder of said edge by a distance substantially equal to the diameter of the wire forming the spring.

5. An attachment device according to claim 4, wherein the two slots in the case are located at different distances from the large base of the trapezoidal case, these two slots being offset one from the other and parallel to the base of the trapezoidal case, the two said ends of the spring being urged resiliently mutually towards each other, and each spring end passing through a slot with parallel edges formed in the plate with parallel edges, intersecting and extending inwardly from a different oblique edge of the plate, all four slots extending generally parallel to the large bases of the case and plate trapeziums, but the two slots through which each given spring end passes being inclined with respect to each other so that the force of each spring end in the direction parallel to the bases results in pulling the plate and the case towards each other in the direction perpendicular to said large bases, such that introduction of each spring end into its respective pair of slots in the case and plate is naturally irreversible.

6. An attachment device according to claim 1, wherein the plate is positioned immediately against one of the said trapezoidal case face by the said spring, which spring is interposed in the case between the said plate and the other trapezoidal face of the case.

7. An attachment device according to claim 1, wherein each slot formed in the trapezoidal face of the case extends parallel to the large base of the trapezium of the case and wherein each corresponding slot formed in the plate is inclined slightly with respect to said large base inwardly and downwardly toward the base.

8. An attachment device according to claim 1, wherein the end of the trapezoidal plate disposed away from the large base of its trapezium is formed as a narrow portion so that the beginning of introduction of the plate into the case which has the spring fitted therein is facilitated and so that such introduction results in automatically moving the spring in the correct direction.

9. An attachment device according to claim 8, wherein the said narrowed end of the trapezoidal plate is movable between the two ends of the spring when beginning introduction of the plate into the case.

* * * * *